United States Patent
Shen et al.

(10) Patent No.: US 11,575,264 B2
(45) Date of Patent: Feb. 7, 2023

(54) DISTRIBUTED POWER SUPPLY SYSTEM AND ENERGY REGULATION METHOD THEREOF

(71) Applicant: Delta Electronics (Shanghai) Co., Ltd., Shanghai (CN)

(72) Inventors: Guoqiao Shen, Shanghai (CN); Changyong Wang, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 9 days.

(21) Appl. No.: 17/233,522

(22) Filed: Apr. 18, 2021

(65) Prior Publication Data
US 2021/0336439 A1 Oct. 28, 2021

(30) Foreign Application Priority Data
Apr. 27, 2020 (CN) .......................... 202010343852.6

(51) Int. Cl.
  *H02J 3/32* (2006.01)
  *H02J 1/10* (2006.01)
(52) U.S. Cl.
  CPC .................. *H02J 3/32* (2013.01); *H02J 1/102* (2013.01); *H02J 2300/30* (2020.01)
(58) Field of Classification Search
  CPC .......................... H02J 3/28–32; H02J 2300/30
  See application file for complete search history.

(56) References Cited

U.S. PATENT DOCUMENTS

| | | | |
|---|---|---|---|
| 6,985,799 B2* | 1/2006 | Zalesski | H02J 1/102 700/297 |
| 2013/0113287 A1* | 5/2013 | Singh | H02J 4/00 307/46 |

(Continued)

FOREIGN PATENT DOCUMENTS

| CN | 104538982 B | 8/2016 |
|---|---|---|
| CN | 105914803 A | 8/2016 |

(Continued)

OTHER PUBLICATIONS

English machine translation of JP-2018019579-A document published Feb. 1, 2018. (Year: 2018).*

*Primary Examiner* — Rexford N Barnie
*Assistant Examiner* — David A Shiao
(74) *Attorney, Agent, or Firm* — CKC & Partners Co., LLC

(57) ABSTRACT

A distributed power supply system includes a plurality of energy modules, a plurality of power conversion modules, and a bus voltage controller. The energy modules are electrically connected to a DC bus via corresponding power conversion modules, and the bus voltage controller is connected to the power conversion modules. An energy regulation method includes: acquiring at least one energy state parameter of the corresponding energy module and computing a base value of the respective power conversion module; generating a normalized control signal based on a bus voltage of the DC bus and transmitting the control signal to the power conversion modules by the bus voltage controller; and obtaining a specified control reference value of the power conversion module depending on the control signal and the base value and regulating the corresponding energy module depending on the specified control reference value by the power conversion module.

12 Claims, 2 Drawing Sheets

(56) References Cited

U.S. PATENT DOCUMENTS

| | | | |
|---|---|---|---|
| 2013/0181519 A1* | 7/2013 | Lee .......................... | H02J 3/28 |
| | | | 307/24 |
| 2016/0028237 A1* | 1/2016 | Ito ............................ | H02J 3/32 |
| | | | 307/82 |
| 2017/0366023 A1* | 12/2017 | Tanaka ................ | H01M 10/443 |
| 2018/0198276 A1* | 7/2018 | Zubieta ................ | H02J 7/0068 |
| 2019/0334349 A1 | 10/2019 | Liu | |
| 2021/0066929 A1* | 3/2021 | Suzuki ..................... | H02J 3/32 |
| 2021/0159715 A1* | 5/2021 | Agamy .................... | H02J 7/35 |
| 2021/0175025 A1* | 6/2021 | Zhou ......................... | H02J 3/32 |

FOREIGN PATENT DOCUMENTS

| | | | | |
|---|---|---|---|---|
| JP | 2018019579 A | * | 2/2018 | ............... H02J 3/32 |
| WO | WO-2014167802 A1 | * | 10/2014 | ............... H02J 5/00 |
| WO | 2018201224 A1 | | 11/2018 | |
| WO | WO-2019054231 A1 | * | 3/2019 | ............... H02J 7/00 |

\* cited by examiner

DISTRIBUTED POWER SUPPLY SYSTEM AND ENERGY REGULATION METHOD THEREOF

CROSS-REFERENCE TO RELATED APPLICATIONS

This non-provisional application claims priority under 35 U.S.C. § 119(a) on Patent Application No. 202010343852.6 filed in P.R. China on Apr. 27, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to a distributed power supply system and an energy regulation method thereof.

2. Related Art

The fuel cell power supply system has advantages such as high efficiency, large power density, modularization and long life span, and is a trend of energy development. For example, SOFCs (Solid Oxide Fuel Cells) in the state of the art can achieve a comprehensive efficiency of 80% to 90%.

However, currently the fuel cells have the disadvantages of low output voltage, large fluctuation of the DC voltage, and poor adaptability to the low-frequency ripple, so it requires a DC/DC converter for front-end boost and voltage regulation control. However, during operation of a large power fuel cell power supply system, the DC/DC converter mainly controls a DC bus voltage, and is poor in its capability of current control and regulation on the fuel cells.

On one hand, in order to divide output power evenly among the fuel cell modules in the fuel cell power supply system, methods such as centralized communication and droop control are usually adopted for multiple DC/DC converters. However, the centralized communication has disadvantages of a slow response and a low reliability, while in droop control, accuracy of the bus voltage and balance degree of current among the fuel cell modules usually need to be compromised. In order to achieve higher accuracy of the bus voltage, there is still an imbalance of current among the fuel cell modules.

On the other hand, due to factors such as manufacturing process, service life and health condition, there are differences in power generation efficiencies, output voltages, electric stack temperatures, and so on among multiple fuel cell modules. So it is necessary to optimize operation of the fuel cell power supply system by utilizing characteristic parameters of the fuel cells effectively.

SUMMARY OF THE INVENTION

An object of the invention is to provide a distributed power supply system and an energy regulation method thereof capable of optimizing power balance and energy deployment among multiple energy modules while controlling bus voltage/current.

To realize the above object, one embodiment of the invention provides an energy regulation method for a distributed power supply system including a plurality of energy modules, a plurality of power conversion modules, and a bus voltage controller, wherein the plurality of energy modules are electrically connected to a DC bus via corresponding power conversion modules, and the bus voltage controller is connected to the plurality of power conversion modules. The energy regulation method includes acquiring at least one energy state parameter of the corresponding energy module and computing a base value of the power conversion module by the power conversion module, generating a normalized control signal based on a bus voltage of the DC bus and transmitting the control signal to the respective power conversion modules by the bus voltage controller, and obtaining a specified control reference value of the respective power conversion module depending on the control signal and the base value, and regulating the corresponding energy module depending on the specified control reference value by the power conversion module.

To realize the above object, one embodiment of the invention provides a distributed power supply system including a plurality of energy modules, a plurality of power conversion modules electrically connecting the corresponding energy modules to a DC bus, respectively. and a bus voltage controller in communication with the plurality of power conversion modules, wherein the power conversion module is adapted to acquire at least one energy state parameter of the corresponding energy module and form a base value of the power conversion module, the bus voltage controller is adapted to generate a normalized control signal based on a bus voltage of the DC bus and transmit the control signal to the respective power conversion modules, and the power conversion modules is adapted to obtain a specified control reference value the power conversion module depending on the control signal and the base value and regulate the corresponding energy module depending on the specified control reference value.

The embodiments of the invention allow the distributed power supply system to have good extensibility, maintainability and quick response performance by introducing a base value in the respective power conversion module, using a normalized control signal and sending the control signal to the plurality of power conversion modules in a digital broadcast manner. On the basis of satisfying control of common bus voltage and substantial balance of output power of the respective energy modules, energy/power optimized regulation based on operation conditions of the respective energy modules may be realized.

The additional aspects and advantages of the invention are partially explained in the following description, and are partially becoming apparent from the description, or can be obtained through practice of the invention.

BRIEF DESCRIPTION OF THE DRAWINGS

The exemplary embodiments are described in detail with reference to the accompanying drawings, through which the above and other features and advantages of the invention will become more apparent.

DETAILED EMBODIMENTS OF THE INVENTION

Figure 1:
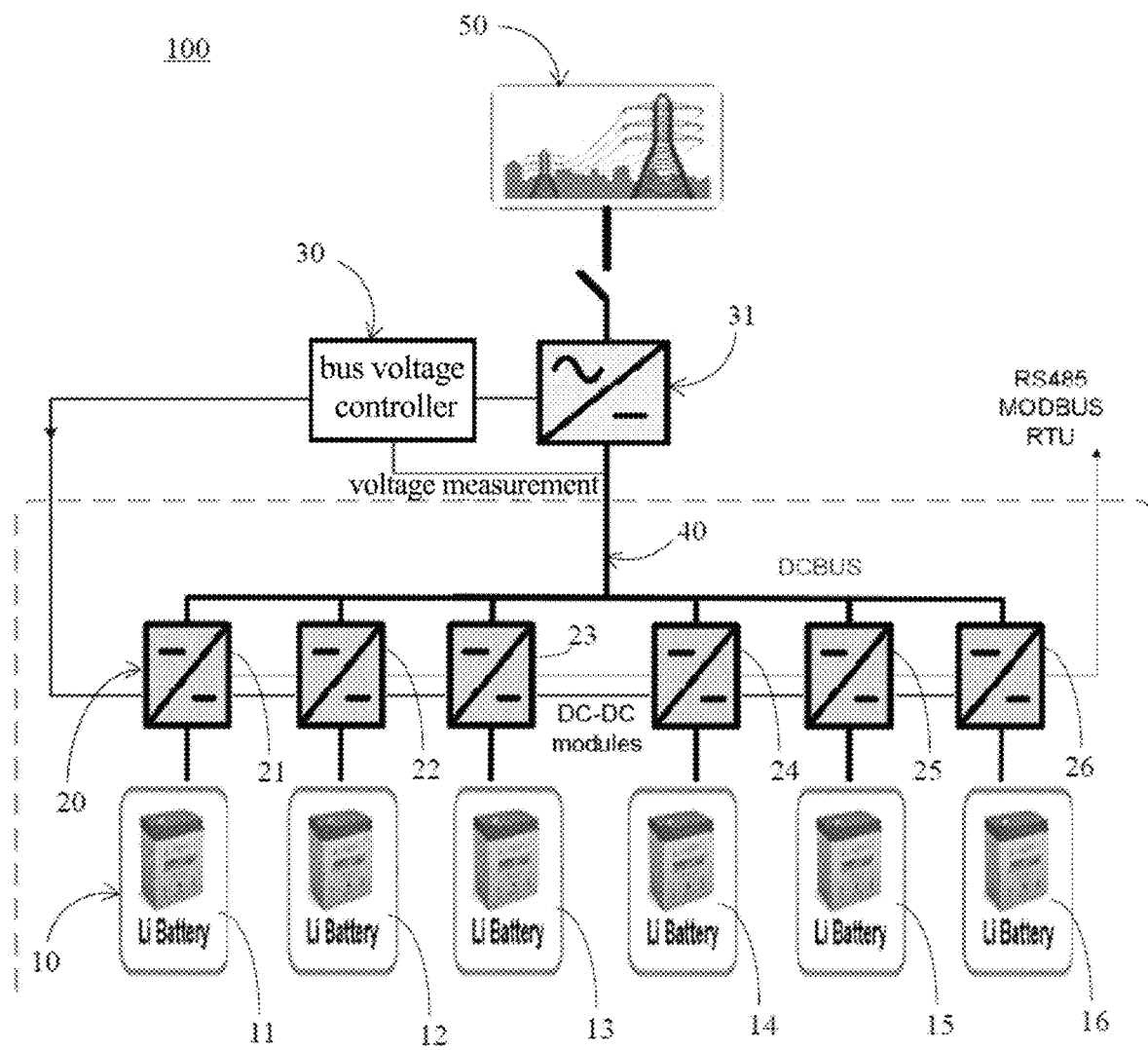
FIG. 1 is a structural diagram of a distributed power supply system according to one embodiment of the present invention.

The exemplary embodiments will now be described more fully with reference to the accompanying drawings. However, the exemplary embodiments can be implemented in various forms and should not be understood as being limited to the embodiments set forth herein; on the contrary, these embodiments are provided so that this invention will be thorough and complete, and the conception of exemplary embodiments will be fully conveyed to those skilled in the art. In the drawings, the same reference numeral denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It should be understood that if the signed device reverses to turn upside down, the described component on an "upper" side will become a component on a "lower" side. In addition, the terms "first", "second" and the like in the claims are only used as signs, instead of numeral limitations to objects.

As shown in FIG. 1, a distributed power supply system 100 of one embodiment of the invention include s a plurality of energy modules 10, a plurality of power conversion modules 20, and a bus voltage controller 30. The plurality of power conversion modules 20 electrically connects the corresponding energy modules 10 to a DC bus 40, respectively. For example, FIG. 1 illustrates six fuel cell energy modules 11 to 16 electrically connected to the corresponding power conversion modules 21 to 26, respectively, which are electrically connected to the DC bus 40. The bus voltage controller 30 is in wired or wireless communication with the plurality of power conversion modules 20.

In the embodiment, the power conversion modules 21 to 26 may include DC/DC conversion modules, and may be further connected to a power grid 50 via the DC bus 40 through an AC/DC conversion module 31. The energy modules 11 to 16 may include fuel cells and/or lithium batteries. The bus voltage controller 30 may be integrated into the AC/DC conversion module 31, or is arranged separately outside the AC/DC conversion module 31.

Figure 2:
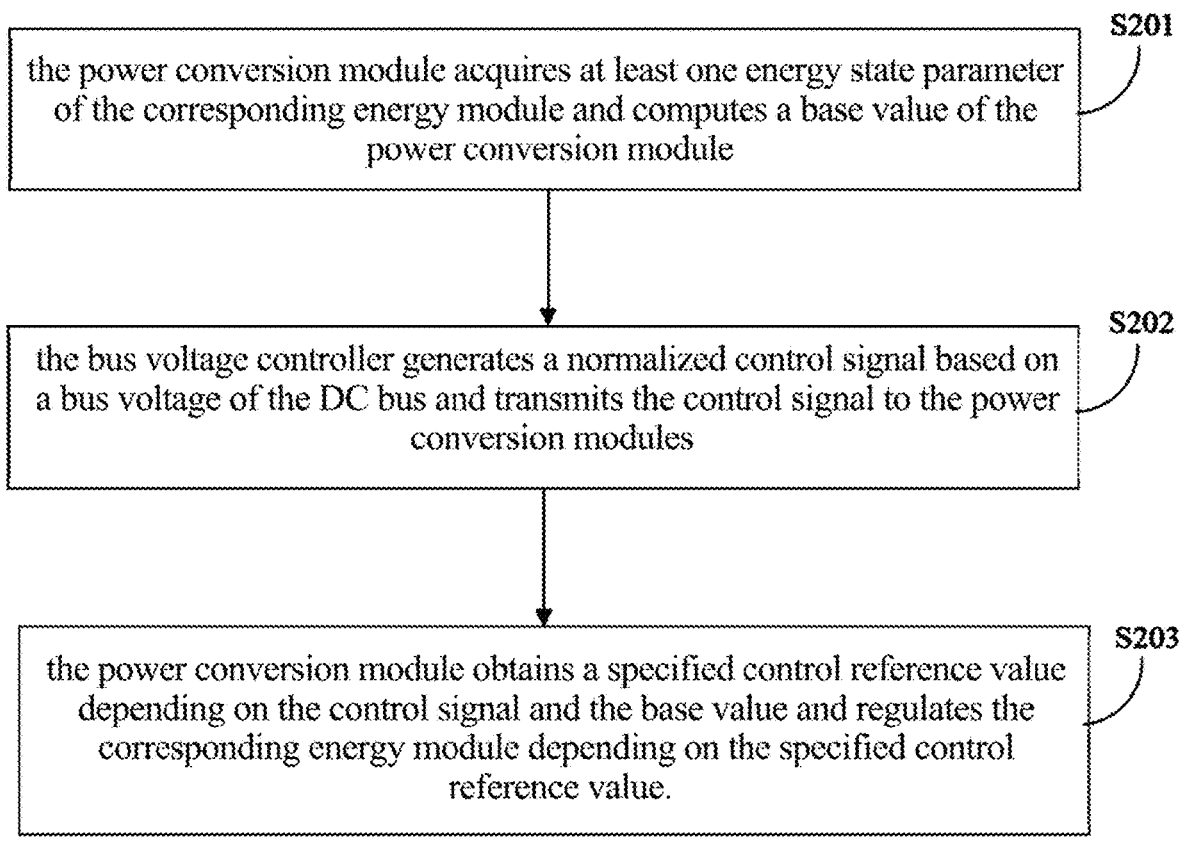
FIG. 2 is a flow diagram of an energy regulation method for the distributed power supply system according to one embodiment of the present invention.

Referring to FIG. 1, as shown in FIG. 2, an energy regulation method for the distributed power supply system of one embodiment of the present invention includes:

in step S201, the power conversion module 20 acquires at least one energy state parameter of the corresponding energy module 10 and computes a base value of the power conversion module 20;

in step S202, the bus voltage controller 30 generates a normalized control signal based on a bus voltage of the DC bus 40 and transmits the control signal to the respective power conversion modules 20; and in step S203, the power conversion module 20 obtains a specified control reference value for respective power conversion module 20 depending on the control signal and the base value and regulates the corresponding energy module 10 depending on the specified control reference value.

In one embodiment, in step S201, each of the power conversion modules 20 acquires at least one energy state parameter from the corresponding energy module 10 and computes a base value of the respective power conversion module 20. In one embodiment, in step S201, power conversion modules 20 acquire energy state parameters of the energy modules 10 and compute base values of the power conversion modules 20, respectively.

In one embodiment, in step S202, the bus voltage controller 30 generates the normalized control signal based on a bus voltage of the DC bus 40 and transmits the control signal to all the power conversion modules 20.

In one embodiment, in step S203, each of the power conversion modules 20 obtains the specified control reference value for respective power conversion module 20 depending on the control signal and the base value and regulates the output of the corresponding energy module 10 depending on the specified control reference value.

In other embodiment, step S202 and step S203 may be executed either simultaneously or not. The power conversion modules 20 may acquire the energy state information from the corresponding energy modules 10 at a first update frequency through digital communication. The bus voltage controller 30 may transmit the normalized control signal to the respective power conversion modules 20 at a second update frequency through broadcast communication. In one embodiment, the second update frequency may be larger than the first update frequency.

In one embodiment, the first update frequency may be 10 Hz, for example, and is usually determined by a time interval where energy state changes obviously. The second update frequency may be 1 kHz, for example, and is usually determined by a controlled response time demand of the bus voltage. Since energy stored in the DC bus is far less than that in the energy modules, change of the voltage state of the DC bus is more sensitive and faster than change of the energy state parameter of the energy modules, and the overall performance of the distributed power supply system may be improved by selecting the update frequency accordingly.

In one embodiment, the power conversion modules 20 may also acquire a rated output value of the corresponding energy modules 10, and compute the base value of the respective power conversion modules 20 depending on the rated output value and the energy state parameter. For example, the power conversion modules 20 may compute a quotient of the energy state parameter of the corresponding energy module 10 and an average value of the energy state parameters of the plurality of energy modules 10, and multiply the quotient by the rated output value to obtain the base value of the respective power conversion modules 20. The base value is associated with energy states of respective connections, and may be transmitted to the respective power conversion modules through collection and communication of the energy state information, wherein an information collection and communication unit may be disposed inside an energy apparatus (i.e., an energy module) or within a device outside the energy apparatus. The energy state parameter includes but not limited to an output voltage value, a specified output voltage value, a specified output current value, a temperature detection value, a power detection value, and a conversion efficiency computed value, a state of charge (SOC) detection value, and a health level detection value of the energy module, i.e., it may be one or more factors that limit or optimize normal input or output power of energy sources (i.e., energy modules), and may be acquired from the respective energy apparatus (i.e., energy modules) and system apparatus by the respective power conversion modules through communication computation. The respective power conversion modules 20 may, for example, be in communication with other components under RS485 serial communication standard. The control signal is a normalized current or power value, which may be a value between −1 to 1 obtained by detection and error calculation on the bus voltage of the DC bus 40 by the bus voltage controller 30 and transmitted to each power conversion module 20 via broadcast communication.

In the output control of voltage/current or power of the respective power conversion modules, the embodiment may determine computation of a specified output value of each power conversion module on basis of multiplication of two input variables (i.e., the normalized control signal and the base value) using a concentrated bus voltage control mode.

Hereinafter the energy regulation method of one embodiment of the invention and its advantages are described in detail as below.

Embodiment 1

The plurality of power conversion modules 20 connects the DC bus 40 and the plurality of energy modules 10 (e.g., lithium battery packs). The bus voltage controller 30 is adapted to measure a bus voltage, generate a current or power control signal, and transmit it in parallel to all power conversion modules 20 through digital communication. The bus voltage controller 30 may be integrated into a power conversion system (PCS) module 31, and may also be a separate external controller. To achieve rapid communication control, a current instruction sent from the PCS may include a normalized current value (from −1 to 1). Meanwhile, the power conversion modules 20 is configured to determine the base value depending on current parameters and SOC parameters of the correspondingly connected energy modules 10. In one embodiment, the base value may be a multiplication of a rated current value of the energy module 10 and its SOC parameter, and the SOC parameter equals to a quotient of the SOC value of the energy module 10 and an average SOC value of all battery packs.

As such, by introducing a baseline factor in control of the respective power conversion modules, using a normalized control signal, and sending the control signal to the plurality of power conversion modules in a digital broadcast manner, the embodiment of the present invention realizes optimized energy/power regulation based on operation conditions of the respective energy modules while satisfying common bus voltage control and a substantial balance of output power of the respective energy modules, and the distributed power supply system may have good extensibility, maintainability and quick response performance. Generally, the first update frequency may be determined by a time interval where energy state of the energy module changes obviously. Taking battery for example, an SOC state update frequency of 10 Hz may be fast enough. Generally, the second update frequency may be determined by a controlled response time demand of the bus voltage. Taking DC side of an inverter for example, a voltage control update frequency of 500 Hz or higher may be necessary for stability of the DC bus voltage and dynamic performance. The reason is that energy stored by the DC bus is far less than that of the energy modules, so change of the voltage state of the DC bus is more sensitive and faster than change of the energy state parameter of the energy modules. On the other hand, in a multi-energy integrated system, energy state update at a low frequency also allows the bus voltage controller to have more time to process communication between the plurality of power conversion modules and the plurality of energy modules in a time-sharing manner, which facilitates realizing a low cost and high efficient utilization of communication resources and central processing unit (CPU) time resources.

Exemplary embodiments of the invention have been shown and described above. It should be understood that the invention is not limited to the disclosed embodiments. Instead, the invention intends to cover various modifications and equivalent settings included in the spirit and scope of the appended claims.

The application provides an energy regulation method for a distributed power supply system including a plurality of energy storage devices, a plurality of power conversion devices, and a bus voltage controller, wherein the plurality of energy storage devices are electrically connected to a DC bus in parallel via corresponding ones of the plurality of power conversion devices, and the bus voltage controller is connected to the plurality of power conversion devices, the energy regulation method comprising: acquiring at least one energy state parameter of the corresponding energy storage device by each of the plurality of power conversion devices; computing a respective base value of the respective power conversion devices by each of the plurality of power conversion devices, each of the plurality of power conversion devices computes a quotient of the energy state parameter of the corresponding energy storage device to an average value of the energy state parameters of the plurality of energy storage devices and multiplies the quotient by the rated output value to obtain the base value of the respective power conversion device; generating a normalized control signal based on a bus voltage of the DC bus by the bus voltage controller, the normalized control signal comprises at least one of a normalized current value and a normalized power value; transmitting the normalized control signal to each of the plurality of power conversion devices by the bus voltage controller; obtaining a respective specified control reference value of the respective power conversion devices according to the product of the control signal and the base value by each of the plurality of power conversion devices; and regulating power conversion between the DC bus and the corresponding energy storage device according to the respective specified control reference value by each of the plurality of power conversion devices.

The application provides a distributed power supply system including a plurality of energy storage devices; a plurality of power conversion devices electrically connecting corresponding ones of the plurality of energy storage devices in parallel to a DC bus; and a bus voltage controller in communication with the plurality of power conversion devices; wherein each of the plurality of power conversion devices is adapted to acquire at least one energy state parameter of the corresponding energy storage device and compute a respective base value of the respective power conversion devices, each of the plurality of power conversion devices computes a quotient of the energy state parameter of the corresponding energy storage device to an average value of the energy state parameters of the plurality of energy storage devices and multiplies the quotient by the rated output value to obtain the base value of the respective power conversion device; the bus voltage controller is adapted to generate a normalized control signal based on a bus voltage of the DC bus and transmit the control signal to each of the plurality of power conversion devices, the normalized control signal comprises at least one of a normalized current value and a normalized power value; and each of the plurality of power conversion devices is adapted to obtain a respective specified control reference value of the respective power conversion devices according to the product of the normalized control signal and the base value and regulate power conversion between the DC bus and the corresponding energy storage device according to the respective specified control reference value.

What is claimed is:

1. An energy regulation method for a distributed power supply system comprising a plurality of energy storage devices, a plurality of power conversion devices, and a bus voltage controller, wherein the plurality of energy storage devices are electrically connected to a DC bus in parallel via corresponding ones of the plurality of power conversion devices, and the bus voltage controller is connected to the plurality of power conversion devices, the energy regulation method comprising:

acquiring, by each of the plurality of power conversion devices, a rated output value and at least one energy state parameter of the corresponding energy modules device;

computing, by each of the plurality of power conversion devices, a respective base value of the respective power conversion devices, each of the plurality of power conversion devices computes a quotient of the energy state parameter of the corresponding energy storage device to an average value of the energy state parameters of the plurality of energy storage devices and multiplies the quotient by the rated output value of the corresponding energy storage device to obtain the base value of the respective power conversion device;

generating, by the bus voltage controller, a normalized control signal based on a bus voltage of the DC bus, the normalized control signal comprises at least one of a normalized current value and a normalized power value;

transmitting, by the bus voltage controller, the normalized control signal to each of the plurality of power conversion devices;

obtaining, by each of the plurality of power conversion devices, a respective specified control reference value of the respective power conversion devices according to the product of the normalized control signal and the respective base value; and regulating, by each of the plurality of power conversion devices, power conversion between the DC bus and the corresponding energy storage device according to the respective specified control reference value.

2. The energy regulation method for a distributed power supply system according to claim 1, wherein, each of the plurality of power conversion devices acquires the energy state parameter from the corresponding energy storage device at a first update frequency;

the bus voltage controller transmits the normalized control signal to each of the plurality of power conversion devices at a second update frequency, wherein the second update frequency is larger than the first update frequency.

3. The energy regulation method for a distributed power supply system according to claim 2, wherein each of the plurality of power conversion devices acquires the energy state parameter at the first update frequency through digital communication, and the bus voltage controller transmits the normalized control signal to each of the plurality of power conversion devices at the second update frequency through broadcast communication.

4. The energy regulation method for a distributed power supply system according to claim 1, wherein, the energy state parameter comprises at least one of an output voltage value, an output voltage system set value, an output current set value, a temperature detection value, a power detection value, and a conversion efficiency computed value of the energy storage device, a state of charge detection value of the energy storage device, and a health level detection value of the energy storage device.

5. The energy regulation method for a distributed power supply system according to claim 1, wherein the power conversion devices comprise DC/DC conversion modules; and/or the energy storage devices comprise fuel cells.

6. A distributed power supply system, comprising:

a plurality of energy storage devices;

a plurality of power conversion devices electrically connecting corresponding ones of the plurality of energy storage devices in parallel to a DC bus; and a bus voltage controller in communication with the plurality of power conversion devices;

wherein each of the plurality of power conversion devices is adapted to acquire a rated output value and at least one energy state parameter of the corresponding energy storage device and compute a respective base value of the respective power conversion devices, each of the plurality of power conversion devices computes a quotient of the energy state parameter of the corresponding energy storage device to an average value of the energy state parameters of the plurality of energy storage devices and multiplies the quotient by the rated output value of the corresponding energy storage device to obtain the base value of the respective power conversion device;

the bus voltage controller is adapted to generate a normalized control signal based on a bus voltage of the DC bus and transmit the normalized control signal to each of the plurality of power conversion devices, the normalized control signal comprises at least one of a normalized current value and a normalized power value; and each of the plurality of power conversion devices is adapted to obtain a respective specified control reference value of the respective power conversion devices according to the product of the normalized control signal and the respective base value and regulate power conversion between the DC bus and the corresponding energy storage device according to the respective specified control reference value.

7. The distributed power supply system according to claim 6, wherein, each of the plurality of power conversion devices is adapted to acquire the energy state parameter from the corresponding energy storage devices at a first update frequency;

the bus voltage controller is adapted to transmit the normalized control signal to each of the plurality of power conversion devices at a second update frequency, wherein the second update frequency is larger than the first update frequency.

8. The distributed power supply system according to claim 7, wherein each of the plurality of power conversion devices is adapted to acquire the energy state parameter at the first update frequency through digital communication, and the bus voltage controller is adapted to transmit the normalized control signal to each of the plurality of power conversion devices at the second update frequency through broadcast communication.

9. The distributed power supply system according to claim 8, wherein, the energy state parameter comprises at least one of an output voltage value, a specified output voltage system value, a specified output current value, a temperature detection value, a power detection value, and a computed conversion efficiency value, a state of charge detection value, and a health level detection value of the energy storage device.

10. The distributed power supply system according to claim 6, wherein the power conversion devices comprise DC/DC conversion modules; and/or the energy storage devices comprise fuel cells.

11. The distributed power supply system according to claim 6, wherein the DC bus is further connected to a power grid through an AC/DC conversion module.

12. The distributed power supply system according to claim 11, wherein the bus voltage controller is integrated into the AC/DC conversion module, or is separately arranged outside the AC/DC conversion module.

* * * * *